(12) United States Patent
Kleiman

(10) Patent No.: US 6,961,749 B1
(45) Date of Patent: Nov. 1, 2005

(54) SCALABLE FILE SERVER WITH HIGHLY AVAILABLE PAIRS

(75) Inventor: Steven Kleiman, Los Altos, CA (US)

(73) Assignee: Network Appliance, Inc., Sunnyvale, CA (US)

(*) Notice: Subject to any disclaimer, the term of this patent is extended or adjusted under 35 U.S.C. 154(b) by 0 days.

(21) Appl. No.: 09/383,340

(22) Filed: Aug. 25, 1999

(51) Int. Cl.[7] ................. G06F 13/00; G06F 15/163
(52) U.S. Cl. ..................... 709/203; 714/11; 710/100
(58) Field of Search .......................... 709/200–203, 709/212, 216, 201, 208, 209, 211, 238, 230; 714/1, 9, 10–13; 710/100, 305–306

(56) References Cited

U.S. PATENT DOCUMENTS

| | | | |
|---|---|---|---|
| 4,825,354 A | 4/1989 | Agrawal et al. | 364/200 |
| 4,937,763 A | 6/1990 | Mott | 364/550 |
| 4,984,272 A | 1/1991 | McIlroy et al. | 380/25 |
| 5,067,099 A | 11/1991 | McCown et al. | 364/550 |
| 5,109,350 A | 4/1992 | Henwood et al. | |
| 5,113,442 A | 5/1992 | Moir | 380/25 |
| 5,144,659 A | 9/1992 | Jones | 380/4 |
| 5,193,151 A | 3/1993 | Jain | |
| 5,202,983 A | 4/1993 | Orita et al. | 395/600 |
| 5,222,217 A | 6/1993 | Blount et al. | 395/325 |
| 5,224,095 A | 6/1993 | Woest et al. | |
| 5,251,308 A | 10/1993 | Frank et al. | |
| 5,283,830 A | 2/1994 | Hinsley et al. | 380/25 |
| 5,392,446 A | 2/1995 | Tower et al. | |
| 5,454,095 A | 9/1995 | Kraemer et al. | |
| 5,485,574 A | 1/1996 | Bolosky et al. | |
| 5,504,883 A | 4/1996 | Coverston et al. | |
| 5,506,955 A | 4/1996 | Chen et al. | |
| 5,566,297 A * | 10/1996 | Devarakonda et al. | 395/182.13 |
| 5,572,711 A | 11/1996 | Hirsch et al. | 395/500 |

(Continued)

FOREIGN PATENT DOCUMENTS

EP 0306244 A2 3/1989

(Continued)

OTHER PUBLICATIONS

R. Reichel: "Inside Windows NT Security: Part 1" Windows/DOS Developers' Journal, vol. 4, No. 4, Apr. 1993, pp. 6-19, XP002107445, Lawrence, Ks, USA.

(Continued)

Primary Examiner—Dung C. Dinh
(74) Attorney, Agent, or Firm—Swernofsky Law Group PC

(57) ABSTRACT

The invention provides a file server system and a method for operating that system, which is easily scalable in number and type of individual components. A plurality of file servers are coupled using inter-node connectivity, such as an inter-node network, so that any one node can be accessed from any other node. Each file server includes a pair of file server nodes, each of which has a memory and each of which conducts file server operations by simultaneously writing to its own memory and to that of its twin, the pair being used to simultaneously control a set of storage elements such as disk drives. File server requests directed to particular mass storage elements are routed among file servers using an inter-node switch and processed by the file servers controlling those particular storage elements. The mass storage elements are disposed and controlled to form a redundant array, such as a RAID storage system. The inter-node network and inter-node switch are redundant, so that no single point of failure prevents access to any individual storage element. The file servers are disposed and controlled to recognize failures of any single element in the file server system and to provide access to all mass storage elements despite any such failures.

33 Claims, 4 Drawing Sheets

U.S. PATENT DOCUMENTS

| | | | |
|---|---|---|---|
| 5,604,862 A | 2/1997 | Midgely et al. | 395/182.04 |
| 5,617,568 A | 4/1997 | Ault et al. | 395/612 |
| 5,649,152 A | 7/1997 | Ohran et al. | 395/441 |
| 5,649,196 A | 7/1997 | Woodhill et al. | 395/620 |
| 5,664,106 A | 9/1997 | Caccavale | |
| 5,668,943 A | 9/1997 | Attanasio et al. | |
| 5,668,958 A | 9/1997 | Bendert et al. | 710/128 |
| 5,675,782 A | 10/1997 | Montague et al. | |
| 5,689,701 A | 11/1997 | Ault et al. | 395/610 |
| 5,699,350 A | 12/1997 | Kraslavsky | |
| 5,704,036 A | 12/1997 | Brownmiller et al. | |
| 5,720,029 A | 2/1998 | Kern et al. | |
| 5,721,916 A | 2/1998 | Pardikar | 395/617 |
| 5,737,523 A | 4/1998 | Callaghan et al. | 395/187.01 |
| 5,745,669 A | 4/1998 | Hugard et al. | |
| 5,761,669 A | 6/1998 | Montague et al. | 707/103 |
| 5,781,716 A * | 7/1998 | Hemphill et al. | 395/182.02 |
| 5,812,751 A | 9/1998 | Ekrot et al. | |
| 5,819,292 A | 10/1998 | Hitz et al. | 707/203 |
| 5,819,310 A | 10/1998 | Vishlitzky | 711/114 |
| 5,825,877 A | 10/1998 | Dan et al. | 380/4 |
| 5,835,953 A | 11/1998 | Ohran | 711/162 |
| 5,862,312 A | 1/1999 | Mann et al. | |
| 5,862,348 A * | 1/1999 | Pedersen | 395/200.59 |
| 5,876,278 A | 3/1999 | Cheng | 454/184 |
| 5,890,959 A | 4/1999 | Pettit et al. | 454/184 |
| 5,915,087 A | 6/1999 | Hammond et al. | 395/187.01 |
| 5,918,008 A | 6/1999 | Togawa et al. | |
| 5,920,719 A | 7/1999 | Sutton et al. | |
| 5,931,935 A | 8/1999 | Cabrera et al. | 710/260 |
| 5,950,203 A | 9/1999 | Stakuis et al. | |
| 5,963,962 A | 10/1999 | Hitz et al. | 707/202 |
| 5,996,086 A | 11/1999 | Delaney et al. | 714/4 |
| 5,999,943 A | 12/1999 | Nori et al. | 707/104 |
| 6,038,570 A | 3/2000 | Hitz et al. | |
| 6,072,777 A | 6/2000 | Bencheck et al. | |
| 6,088,694 A * | 7/2000 | Burns et al. | 707/8 |
| 6,088,803 A | 7/2000 | Tso et al. | |
| 6,101,558 A | 8/2000 | Utsunomiya et al. | |
| 6,119,244 A * | 9/2000 | Schoenthal et al. | 714/4 |
| 6,145,121 A | 11/2000 | Levy et al. | |
| 6,148,414 A * | 11/2000 | Brown et al. | 714/9 |
| 6,181,700 B1 | 1/2001 | Doi | |
| 6,216,211 B1 | 4/2001 | McBrearty et al. | |
| 6,243,794 B1 | 6/2001 | Casamatta | |
| 6,275,900 B1 | 8/2001 | Liberty | |
| 6,295,611 B1 | 9/2001 | Connor et al. | |
| 6,317,844 B1 | 11/2001 | Kleiman | |
| 6,327,677 B1 | 12/2001 | Garg et al. | |
| 6,397,307 B2 | 5/2002 | Ohran | |
| 6,405,327 B1 | 6/2002 | Sipple et al. | |
| 6,446,220 B1 * | 9/2002 | Menon | 714/5 |
| 6,728,897 B1 | 4/2004 | Cramer et al. | |
| 2002/0007470 A1 | 1/2002 | Kleiman | |
| 2002/0091670 A1 | 7/2002 | Hitz et al. | |
| 2002/0103783 A1 | 8/2002 | Muhlestein | |

FOREIGN PATENT DOCUMENTS

| | | | |
|---|---|---|---|
| EP | 0308056 A2 | 3/1989 | |
| EP | 0410630 A | 1/1991 | |
| EP | 0 477 039 A | 3/1992 | |
| EP | 0537098 | 4/1993 | |
| EP | 0566967 A | 10/1993 | |
| EP | 0760503 A1 | 3/1997 | |
| JP | 1-273395 | 11/1989 | 361/695 |
| WO | WO 00/11553 A1 | 3/2000 | |
| WO | WO 01/14991 A2 | 3/2001 | |
| WO | WO 01/14991 A3 | 3/2001 | |

OTHER PUBLICATIONS

"Mapping the VM text files to the AIX text files", IBM Technical Disclosure Bulletin., vol. 33, No. 2, Jul. 1990, p. 341 XP000123641, IBM Corp. New York., US ISSN: 0018-8689—the whole document.

"Migrated Data Backup Utility", IBM Technical Disclosure Bulletin., vol. 37, no. 06B, Jun. 1994, pp. 505-507, XP000456079, IBM Corp. New York., US ISSN: 0018-8689.

Norman C. Hutchinson, Stephen Maley, Mike Federwisch, Guy Harris, Dave Hitz, Steven Kleiman, and Sean O'Malley. "Logical vs. Physical File System Backup" USENIX Association.

Steven R. Kleiman, Scott Schoenthal, Alan Rowe, Steven H. Rodrigues, and Arputham Benjamin. "Using Numa Interconnects For Highly Available Filers". 1999 IEEE.

Philip Miller and Michael Cummins. "Chapter 11: Auto Negotiation". Digital Press 2000.

C.C. Charlton, P.H. Leng, R.K. Lloyd and R. Turnbull, "Maintaining Consistency in a Replicated Software Archive". Software-Practice and Experience, vol. 28(3), 285-295 (Mar. 1998). XP-001015373.

John C.S. Lui, Oldfield K.Y. SO and T.S. TAM. "NFS/M: An Open Platform Mobile File System". 1998 IEEE. XP-000883939.

Haseyama, Hiroshi; Tanaka, Tomoaki; and Manabe, Katsutoshi. "Method for Setting Packet Length". Pubn-date: Jun. 4, 1991. JP403131143A.

Jones, Derek C. Toasting the new appliance. (Network Appliance's FAServer 450 dedicated high-performance Network File System server) (Hardware Review) (Evaluation). LAN Magazine, p170(4). Oct., 1995.

Buddhikot. "Design of a large scale multimedia storage server." Computer Networks and ISDN Systems, 1994, 503-517, Elsevier Science B.V.

* cited by examiner

SCALABLE FILE SERVER WITH HIGHLY AVAILABLE PAIRS

BACKGROUND OF THE INVENTION

1. Field of the Invention

The invention relates to storage systems.

2. Related Art

Computer storage systems are used to record and retrieve data. One way storage systems are characterized is by the amount of storage capacity they have. The capacity for storage systems has increased greatly over time. One problem in the known art is the difficulty of planning ahead for desired increases in storage capacity. A related problem in the known art is the difficulty in providing scalable storage at a relatively efficient cost. This has subjected customers to a dilemma; one can either purchase a file system with a single large file server, or purchase a file system with a number of smaller file servers.

The single-server option has several drawbacks. (1) The customer must buy a larger file system than currently desired, so as to have room available for future expansion. (2) The entire file system can become unavailable if the file server fails for any reason. (3) The file system, although initially larger, is not easily scalable if the customer comes to desire a system that is larger than originally planned capacity.

The multi-server option also has several drawbacks. In systems in which the individual components of the multi-server device are tightly coordinated, (1) the same scalability problem occurs for the coordinating capacity for the individual components. That is, the customer must buy more coordinating capacity than currently desired, so as to have room available for future expansion. (2) The individual components are themselves often obsolete by the time the planned-for greater capacity is actually needed. (3) Tightly coordinated systems are often very expensive relative to the amount of scalability desired.

In systems in which the individual components of the multi-server device are only loosely coordinated, it is difficult to cause the individual components to behave in a coordinated manner so as to emulate a single file server. Although failure of a single file server does not cause the entire file system to become unavailable, it does cause any files stored on that particular file server to become unavailable. If those files were critical to operation of the system, or some subsystem thereof, the applicable system or subsystem will be unavailable as a result. Administrative difficulties generally increase to due to a larger number of smaller file servers.

Accordingly, it would be advantageous to provide a method and system for performing a file server system that is scalable, that is, which can be increased in capacity without major system alterations, and which is relatively cost efficient with regard to that scalability. This advantage is achieved in an embodiment of the invention in which a plurality of file server nodes (each a pair of file servers) are interconnected. Each file server node has a pair of controllers for simultaneously controlling a set of storage elements such as disk drives. File server commands are routed among file server nodes to the file server node having control of applicable storage elements, and in which each pair of file servers is reliable due to redundancy.

It would also be advantageous to provide a storage system that is resistant to failures of individual system elements, and that can continue to operate after any single point of failure. This advantage is achieved in an embodiment of the invention like that described in co-pending application Ser. No. 09/037,652 filed Mar. 10, 1998, in the name of the same inventor, titled Available File Servers", U.S. Pat. No. 6,317,844, hereby incorporated by reference as if fully set forth herein.

SUMMARY OF THE INVENTION

The invention provides a file server system and a method for operating that system, which is easily scalable in number and type of individual components. A plurality of file server nodes (each a pair of file servers) are coupled using inter-node connectivity, such as an inter-node network, so that any one pair can be accessed from any other pair. Each file server node includes a pair of file servers, each of which has a memory and each of which conducts file server operations by simultaneously writing to its own memory and to that of its twin, the pair being used to simultaneously control a set of storage elements such as disk drives. File server commands or requests directed to particular mass storage elements are routed among file server nodes using an inter-node switch and processed by the file server nodes controlling those particular storage elements. Each file server node (that is, each pair of file servers) is reliable due to its own redundancy.

In a preferred embodiment, the mass storage elements are disposed and controlled to form a redundant array, such as a RAID storage system. The inter-node network and inter-node switch are redundant, and file server commands or requests arriving at the network of pairs are coupled using the network and the switch to the appropriate pair and processed at that pair. Thus, each pair can be reached from each other pair, and no single point of failure prevents access to any individual storage element. The file servers are disposed and controlled to recognize failures of any single element in the file server system and to provide access to all mass storage elements despite any such failures.

DETAILED DESCRIPTION OF THE PREFERRED EMBODIMENT

In the following description, a preferred embodiment of the invention is described with regard to preferred process steps and data structures. However, those skilled in the art would recognize, after perusal of this application, that embodiments of the invention may be implemented using one or more general purpose processors (or special purpose processors adapted to the particular process steps and data structures) operating under program control, and that implementation of the preferred process steps and data structures described herein using such equipment would not require undue experimentation or further invention.

Inventions described herein can be used in conjunction with inventions described in the following applications:

Application Ser. No. 09/037,652, filed Mar. 10, 1998, Express Mail Mailing No. EE143637441US, in the name of the same inventor, titled "Scalable and Highly Available File Server", U.S. Pat. No. 6,317,844.

This application is hereby incorporated by reference as if fully set forth herein. It is herein referred to as the "Availability Disclosure."

Figure 1:
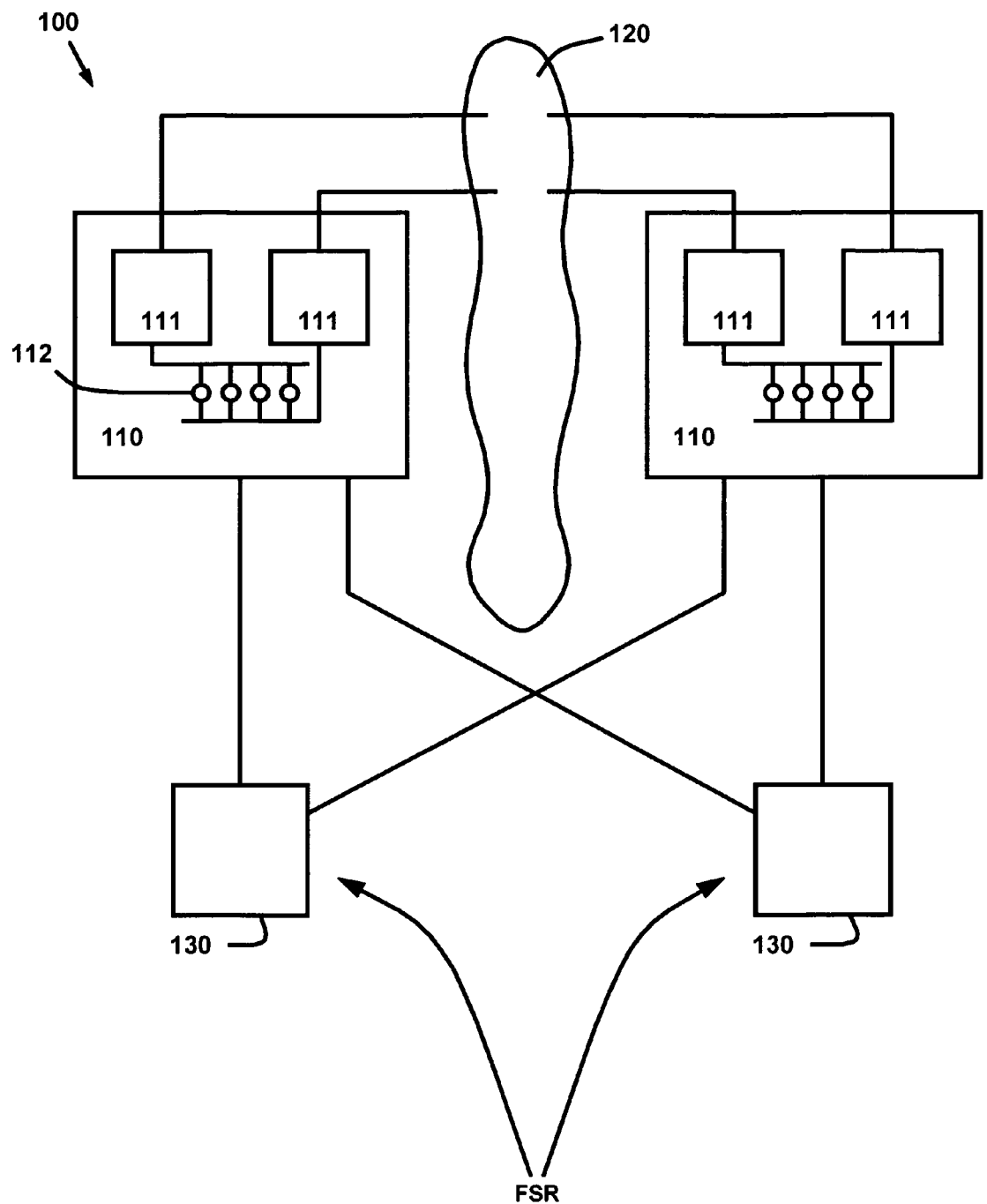
FIG. 1 shows a block diagram of a scalable and highly available file server system.

FIG. 1 shows a block diagram of a scalable and highly available file server system.

A file server system 100 includes a set of file servers 110, each including a coupled pair of file server nodes 111 having co-coupled common sets of mass storage devices 112. Each node 111 is like the file server node further described in the Availability Disclosure. Each node 111 is coupled to a common interconnect 120. Each node 111 is also coupled to a first network switch 130 and a second network switch 130.

Each node 111 is coupled to the common interconnect 120, so as to be able to transmit information between any two file servers 110. The common interconnect 120 includes a set of communication links (not shown) which are redundant in the sense that even if any single communication link fails, each node 111 can still be contacted by each other node 111.

In a preferred embodiment, the common interconnect 120 includes a NUMA (non-uniform memory access) interconnect, such as the SCI interconnect operating at 1 gigabyte per second or the SCI-lite interconnect operating at 125 megabytes per second.

Each file server 110 is coupled to the first network switch 130, so as to receive and respond to file server requests transmitted therefrom. In a preferred embodiment there is also a second network switch 130, although the second network switch 130 is not required for operation of the file server system 100. Similar to the first network switch 130, each file server 110 is coupled to the second network switch 130, so as to receive and respond to file server requests transmitted therefrom.

File Server System Operation

In operation of the file server system 100, as further described herein, a sequence of file server requests arrives at the first network switch 130 or, if the second network switch 130 is present, at either the first network switch 130 or the second network switch 130. Either network switch 130 routes each file server request in its sequence to the particular file server 110 that is associated with the particular mass storage device needed for processing the file server request.

One of the two nodes 111 at the designated file server 110 services the file server request and makes a file server response. The file server response is routed by one of the network switches 130 back to a source of the request.

Figure 2A:
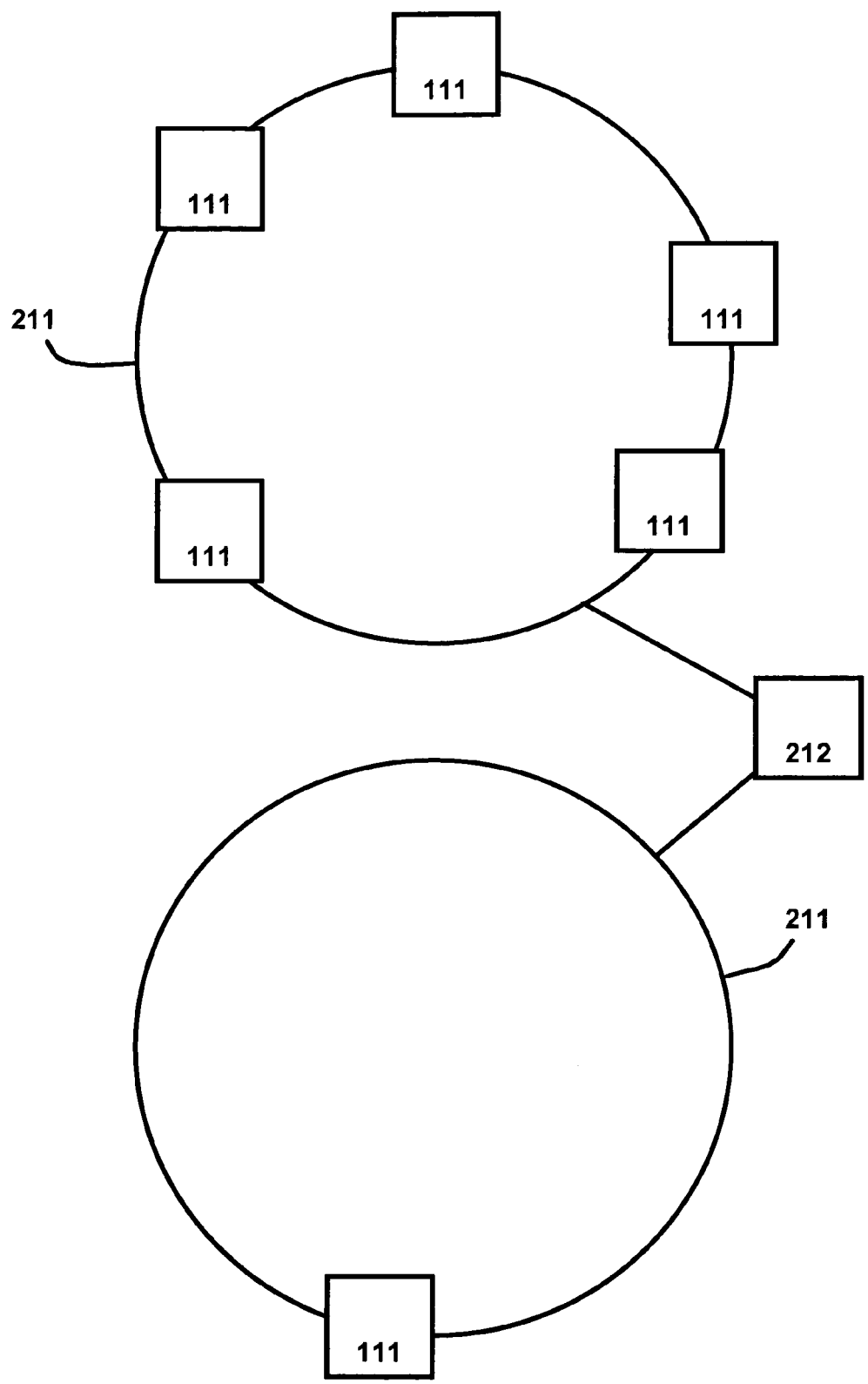
FIG. 2A shows a block diagram of a first interconnect system for the file server system.

FIG. 2A shows a block diagram of a first interconnect system for the file server system.

In a first preferred embodiment, the interconnect 120 includes a plurality of nodes 111, each of which is part of a file server 110. The nodes 111 are each disposed on a communication ring 211. Messages are transmitted between adjacent nodes 111 on each ring 211.

In this first preferred embodiment, each ring 211 comprises an SCI (Scalable Coherent Interconnect) network according to IEEE standard 1596-1992, or an SCI-lite network according to IEEE standard 1394.1. Both IEEE standard 1596-1992 and IEEE standard 1394.1 support remote memory access and DMA; the combination of these features is often called NUMA (non-uniform memory access). SCI networks operate at a data transmission rate of about 1 gigabyte per second; SCI-lite networks operate at a data transmission rate of about 125 megabytes per second.

A communication switch 212 couples adjacent rings 211. The communication switch 212 receives and transmits messages on each ring 211, and operates to bridge messages from a first ring 211 to a second ring 211. The communication switch 212 bridges those messages that are transmitted on the first ring 211 and designated for transmission to the second ring 211. A switch 212 can also be coupled directly to a file server node 111.

In this first preferred embodiment, each ring 211 has a single node 111, so as to prevent any single point of failure (such as failure of the ring 211 or its switch 212) from preventing communication to more than one node 111.

Figure 2B:
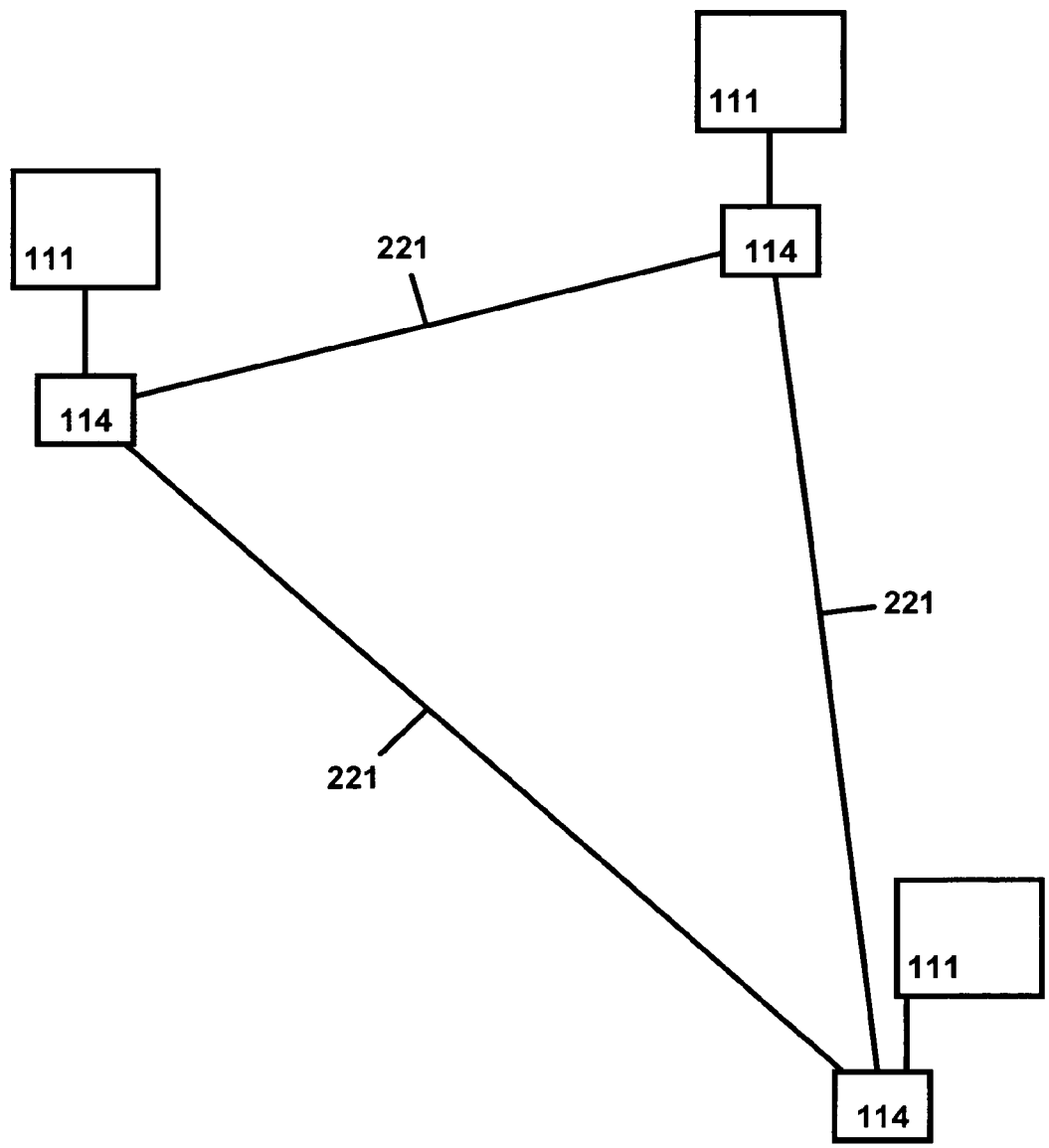
FIG. 2B shows a block diagram of a second interconnect system for the file server system.

FIG. 2B shows a block diagram of a second interconnect system for the file server system.

In a second preferred embodiment, the interconnect 120 includes a plurality of nodes 111, each of which is part of a file server 110. Each node 111 includes an associated network interface element 114. In a preferred embodiment, the network interface element 114 for each node 111 is like that described in the Availability Disclosure.

The network interface elements 114 are coupled using a plurality of communication links 221, each of which couples two network interface elements 114 and communicates messages therebetween.

The network interface elements 114 have sufficient communication links 221 to form a redundant communication network, so as to prevent any single point of failure (such as failure of any one network interface element 114) from preventing communication to more than one node 111.

In this second preferred embodiment, the network interface elements 114 are disposed with the communication links 221 to form a logical torus, in which each network interface element 114 is disposed on two logically orthogonal communication rings using the communication links 221.

In this second preferred embodiment, each of the logically orthogonal communication rings comprises an SCI network or an SCI-lite network, similar to the SCI network or SCI-lite network described with reference to FIG. 2A.

Operation Process Flow

Figure 3:
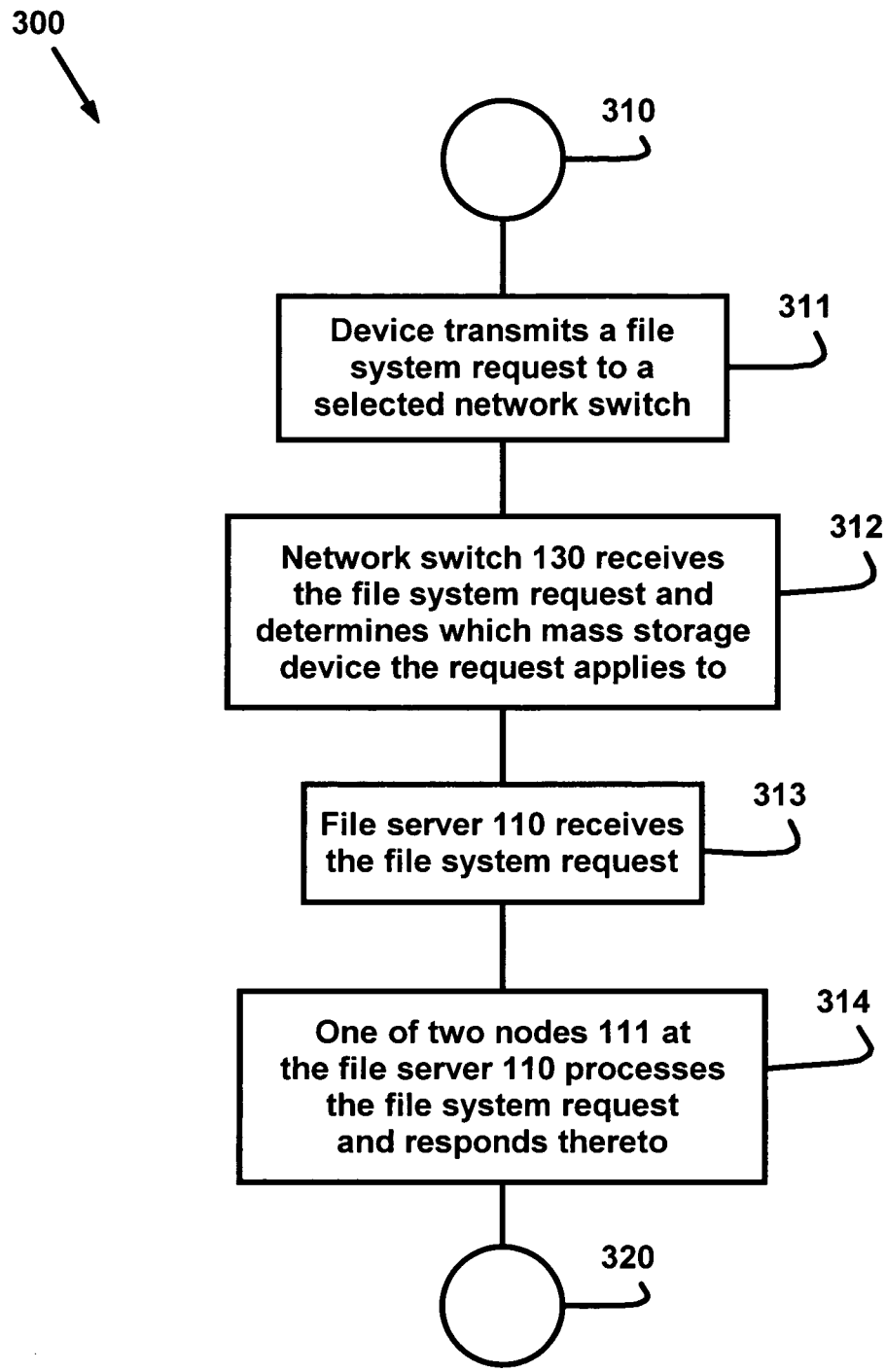
FIG. 3 shows a process flow diagram of operation of the file server system.

FIG. 3 shows a process flow diagram of operation of the file server system.

A method 300 is performed by the components of the file server system 100, and includes a set of flow points and process steps as described herein.

At a flow point 310, a device coupled to the file server system 100 desires to make a file system request.

At a step 311, the device transmits a file system request to a selected network switch 130 coupled to the file server system 100.

At a step 312, the network switch 130 receives the file system request. The network switch 130 determines which mass storage device the request applies to, and determines which file server 110 is coupled to that mass storage device. The network switch 130 transmits the request to that file server 110 (that is, to both of its nodes 111 in parallel), using the interconnect 120.

At a step 313, the file server 110 receives the file system request. Each node 111 at the file server 110 queues the request for processing.

At a step 314, one of the two nodes 111 at the file server 110 processes the file system request and responds thereto. The other one of the two nodes 111 at the file server 110 discards the request without further processing.

At a flow point 320, the file system request has been successfully processed.

If any single point of failure occurs between the requesting device and the mass storage device to which the file system request applies, the file server system 100 is still able to process the request and respond to the requesting device.

If either one of the network switches 130 fails, the other network switch 130 is able to receive the file system request and transmit it to the appropriate file server 110.

If any link in the interconnect 120 fails, the remaining links in the interconnect 120 are able to transmit the message to the appropriate file server 110.

If either node 111 at the file server 110 fails, the other node 111 is able to process the file system request using the appropriate mass storage device. Because nodes 111 at each file server 110 are coupled in pairs, each file server 110 is highly available. Because file servers 110 are coupled together for managing collections of mass storage devices, the entire system 100 is scalable by addition of file servers 110. Thus, each cluster of file servers 110 is scalable by addition of file servers 110.

If any one of the mass storage devices (other than the actual target of the file system request) fails, there is no effect on the ability of the other mass storage devices to respond to processing of the request, and there is no effect on either of the two nodes 111 which process requests for that mass storage device.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. A file server including
a common set of storage elements;
at least a pair of nodes disposed in said file server, each of said nodes being connected to said common set of storage elements and including a processor and a memory so as to be capable of processing file server commands for said common set of storage elements;
at least one inter-node connectivity element coupled to said nodes and disposed to communicate with at least another pair of nodes disposed in another file server; and
a connection for coupling said file server commands to said nodes.

2. A file server as in claim 1, wherein each of said pair of nodes are disposed to failover to each other.

3. A file server as in claim 1, wherein
each of said storage elements corresponds to one node of said pair;
each of said storage elements is coupled to both nodes of said pair;
whereby both nodes of said pair are equally capable of controlling said storage elements.

4. A file server as in claim 1, wherein said connectivity element includes a NUMA network.

5. A file server as in claim 1, wherein sealing for a file server system that includes said file server can be achieved by coupling said pair of nodes to another pair of nodes in another file server through said inter-node connectivity element.

6. A file server as in claim 1, wherein said common set of storage elements includes a RAID storage system.

7. A file server as in claim 1,
wherein said pair of nodes includes a first node and a second node;
wherein when said file server commands are directed to said first node, said file server commands are executed at said first node, and a copy of said file server commands are stored at said second node; and
wherein when said file server commands are directed to said second node, said file server commands are executed at said second node, and a copy of said file server commands are stored at said first node.

8. A file server as in claim 7,
wherein when said file server commands are directed to said first node and said first node is inoperable, said file server commands are executed at said second node; and
wherein when said file server commands are directed to said second node and said second node is inoperable, said file server commands are executed at said first node.

9. A file server as in claim 1,
wherein said pair of nodes includes a first node and a second node;
wherein said first node responds to said file server commands while said second node records said file server commands; and
wherein said pair of nodes are disposed to failover from said first node to said second node.

10. A file server as in claim 1,
wherein said pair of nodes includes a first node and a second node;
wherein said first node responds to a first one of said file server commands while said second node records said first one of said file server commands;
wherein said second node responds to a second one of said file server commands while said first node records said second one of file server commands; and
said pair of nodes are disposed to failover from said first node to said second node.

11. A file server as in claim 1,
wherein said pair of nodes includes a first node and a second node;
wherein said first node controls said storage elements in response to said file server commands while said second node is coupled to said storage elements and does not control said storage elements in response to said file server commands.

12. A method of operating a file server including
operating at least a pair of nodes disposed in said file server, each of said nodes being connected to a common set of storage elements and including a processor and a memory so as to be capable of processing file server commands for said common set of storage elements;
communicating with at least another pair of nodes in at least another file server through at least one inter-node connectivity element coupled to said nodes; and
coupling said file server commands to said nodes.

13. A method of operating a file server as in claim 12, wherein each of said pair of nodes are disposed to failover to each other.

14. A method of operating a file server as in claim 12, wherein
each of said storage elements corresponds to one node of said pair;
each of said storage elements is coupled to both nodes of said pair;
whereby both nodes in said pair are equally capable of controlling said storage elements.

15. A method of operating a file server as in claim 12, wherein said connectivity element includes a NUMA network.

16. A method of operating a file server as in claim 12, wherein scaling for a file server system that includes said file server can be achieved by coupling said pair of nodes to another pair of nodes in another file server through said inter-node connectivity element.

17. A method of operating a file server as in claim 12, wherein said common set of storage elements includes a RAID storage system.

18. A method of operating a file server as in claim 12,
wherein said pair of nodes includes a first node and a second node;
wherein when said file server commands are directed to said first node, said file server commands are executed at said first node, and a copy of said file server commands are stored at said second node; and
wherein when said file server commands are directed to said second node, said file server commands are executed at said second node, and a copy of said file server commands are stored at said first node.

19. A method of operating a file server as in claim 18,
wherein when said file server commands are directed to said first node and said first node is inoperable, said file server commands are executed at said second node; and
wherein when said file server commands are directed to said second node and said second node is inoperable, said file server commands are executed at said first node.

20. A method of operating a file server as in claim 12,
wherein said pair of nodes includes a first node and a second node;
wherein said first node responds to said file server commands while said second node records said file server commands; and
wherein said pair of nodes are disposed to failover from said first node to said second node.

21. A method of operating a file server as in claim 12,
wherein said pair of nodes includes a first node and a second node;
wherein said first node responds to a first one of said file server commands while said second node records said first one of said file server commands;
wherein said second node responds to a second one of said file server commands while said first node records said second one of file server commands; and
said pair of nodes are disposed to failover from said first node to said second node.

22. A method of operating a file server as in claim 12,
wherein said pair of nodes includes a first node and a second node;
wherein said first node controls said storage elements in response to said file server commands while said second node is coupled to said storage elements and does not control said storage elements in response to said file server commands.

23. A memory storing information including instructions, the instructions executable by a processor to operate a file server, the instructions comprising:
operating at least a pair of nodes disposed in said file server, each of said nodes being connected to a common set of storage elements and including a processor and a memory so as to be capable of processing file server commands for said common set of storage elements;
communicating with at least another pair of nodes in at least another file server through at least one inter-node connectivity element coupled to said nodes; and
coupling said file server commands to said nodes.

24. A memory as in claim 23, wherein each of said pair of nodes are disposed to failover to each other.

25. A memory as in claim 23, wherein
each of said storage elements corresponds to one node of said pair;
each of said storage elements is coupled to both nodes of said pair;
whereby both nodes in said pair are equally capable of controlling said storage elements.

26. A memory as in claim 23, wherein said connectivity element includes a NUMA network.

27. A memory as in claim 23, wherein scaling for a file server system that includes said file server can be achieved by coupling said pair of nodes to another pair of nodes in another file server through said inter-node connectivity element.

28. A memory as in claim 23, wherein said common set of storage elements includes a RAID storage system.

29. A memory as in claim 23,
wherein said pair of nodes includes a first node and a second node;
wherein when said file server commands are directed to said first node, said file server commands are executed at said first node, and a copy of said file server commands are stored at said second node; and
wherein when said file server commands are directed to said second node, said file server commands are executed at said second node, and a copy of said file server commands are stored at said first node.

30. A memory as in claim 29,
wherein when said file server commands are directed to said first node and said first node is inoperable, said file server commands are executed at said second node; and
wherein when said file server commands are directed to said second node and said second node is inoperable, said file server commands are executed at said first node.

31. A memory as in claim 23,
wherein said pair of nodes includes a first node and a second node;
wherein said first node responds to said file server commands while said second node records said file server commands; and
wherein said pair of nodes are disposed to failover from said first node to said second node.

32. A memory as in claim 23,
wherein said pair of nodes includes a first node and a second node;
wherein said first node responds to a first one of said file server commands while said second node records said first one of said file server commands;
wherein said second node responds to a second one of said file server commands while said first node records said second one of file server commands; and
said pair of nodes are disposed to failover from said first node to said second node.

33. A memory as in claim 23,
wherein said pair of nodes includes a first node and a second node;
wherein said first node controls said storage elements in response to said file server commands while said second node is coupled to said storage elements and does not control said storage elements in response to said file server commands.

* * * * *